Nov. 10, 1942.   C. D. PETERSON ET AL   2,301,448
TRANSMISSION GEARING
Filed Oct. 23, 1939   2 Sheets—Sheet 1
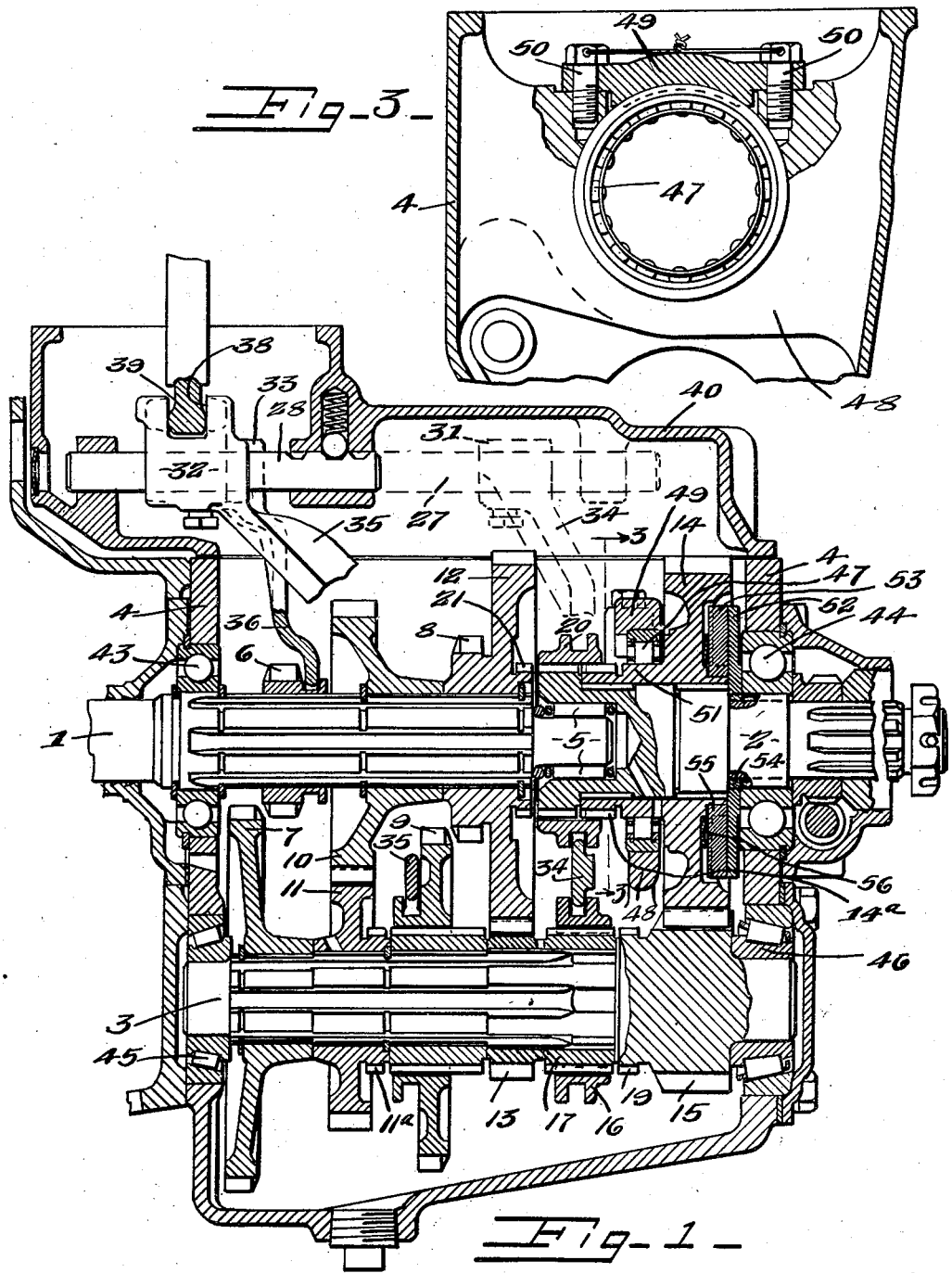

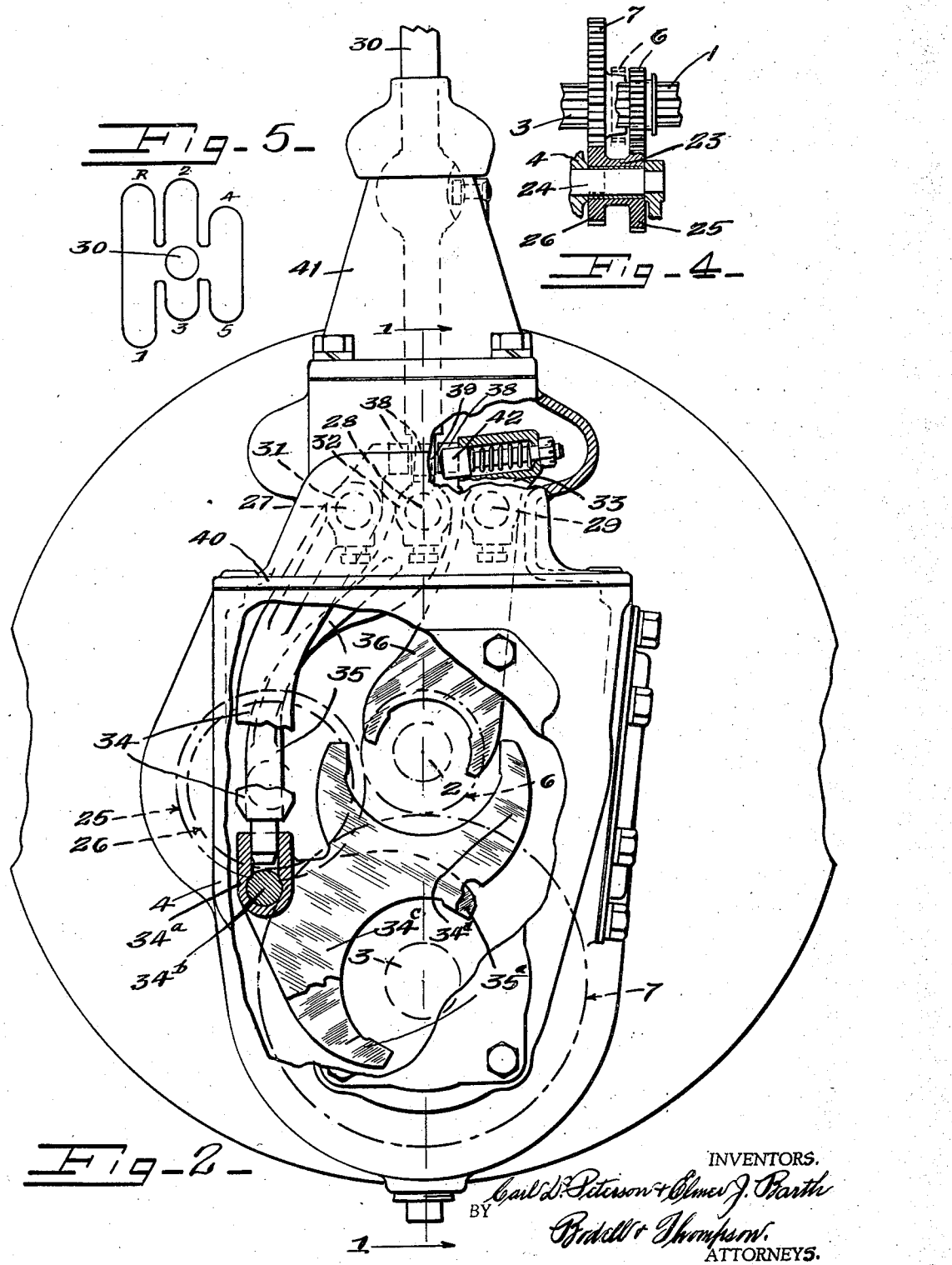

Patented Nov. 10, 1942

2,301,448

UNITED STATES PATENT OFFICE 2,301,448

TRANSMISSION GEARING

Carl D. Peterson and Elmer J. Barth, Toledo, Ohio

Application October 23, 1939, Serial No. 300,686

4 Claims. (Cl. 74—359)

This invention relates to change-speed transmission gearings used in motor vehicles. It has for its object a particularly compact, sturdy, heavy-duty transmission gearing interchangeable with, and having maximum capacity, more gear changes and higher torque rating than transmission gearings heretofore used with less speed changes and less capacity and torque rating, in the same available axial space.

It further has for its object a change-speed gearing in which the countershaft is not actuated or does not rotate when the input and output shafts are clutched together in direct drive relation.

It further has for its object a particularly simple and compact arrangement of gears and clutches giving a maximum number of gear changes within an axial space heretofore required for a less number of gear changes.

The invention consists in the novel features and in the combinations and constructions hereinafter set forth and claimed.

In describing this invention, reference is had to the accompanying drawings in which like characters designate corresponding parts in all the views.

Figure 1 is a longitudinal sectional view of the gearing taken on line 1—1, Figure 2.

Figure 2 is an end elevation, partly broken away, looking to the left in Figure 1.

Figure 3 is a sectional view on line 3—3, Figure 1.

Figure 4 is a fragmentary detail view on a reduced scale of the reverse gearing.

Figure 5 is a diagrammatic view of the path of the selecting and shifting lever.

This transmission gearing comprises input and output shafts arranged in axial alinement, a countershaft suitably mounted in a gear box, a plurality of selectively operable change-speed gear trains between the input and countershafts, a final drive gear train between the counter shaft and the output shaft including a gear rotatably mounted on the output shaft and clutchable thereto, the trains of gears between the input and countershafts being normally out of relation or connection to transmit motion to the countershaft and including shiftable parts selectively operable for bringing the gear trains into operative relation or connection, and a clutch operable into two positions, one to clutch the gear of the final drive train on the output shaft to the output shaft and into another position to clutch the input and output shafts directly together, the arrangement being such that the countershaft is disconnected from the input and output shafts when the input and output shafts are clutched together in direct drive relation.

1 and 2 designate the input and output shafts, and 3 the countershaft. The input and output shafts 1, 2 are arranged in axial alinement in a suitable gear box 4, one having a pilot bearing in the other at 5.

6, 7 designate one train of change-speed gears between the input shaft 1 and the countershaft 3. 8, 9 designate another of such trains; 10, 11 a third train of gears; 12, 13 a fourth train of gears. 14, 15 designate the gears of the final drive train between the countershaft and the output shaft, the gear 14 being normally rotatable about the output shaft and selectively clutchable thereto. The trains of gears 6, 7; 8, 9; 10, 11; 12, 13; are normally out of motion-transmitting position, relation or connection to transmit motion to the countershaft from the input shaft, and in the illustrated embodiment of the invention, the gear 6 is rotatable with or splined to the input shaft 1 and normally out of mesh with its companion gear 7 and shiftable axially into and out of mesh therewith, the gear 7 being rotatable with or splined to the countershaft 3. The gear 8 is rotatable with or splined to the input shaft 1 and normally out of mesh with its companion gear 9 and the gear 9 is rotatable with or splined to the countershaft 3 and shiftable axially in one direction from neutral into and out of mesh with the gear 8. It is also shiftable as a clutch in the opposite direction from neutral for a purpose to be presently described.

The gear 10 is also rotatable with or splined to the input shaft 1 and meshes with its companion gear 11, which is rotatable about the countershaft 3 and clutchable thereto, it being here shown as formed with clutch teeth 11ª coacting with splines or clutch teeth on the hub of the gear 9. The gear 9 is thus shiftable in one direction, as to the right, from neutral into mesh with its companion gear 8, and in the other direction, or to the left, from neutral, to clutch the gear 11 to the countershaft 3. The gear 12 is also rotatable with or splined to the input shaft 1 and meshes with its companion gear 13 rotatable about the countershaft 3 and selectively clutchable thereto, by a clutch 16 slidably keyed or splined to an extension 17 of the hub of the gear 13, and shiftable into and out of engagement with clutch teeth 19 on the counter shaft. Thus, the change speed gear trains 6, 7; 8, 9; 10, 11; 12, 13 are normally out of motion-transmitting relation or connection to transmit motion to the countershaft 3 and include shiftable elements, which are selectively operable to establish the train of gears in motion-transmitting connection or relation. The shiftable elements are the shiftable gear 6 of the train 6, 7, shiftable clutch gear 9 of the train 8, 9 and the gear train 10, 11 and the clutch 16 for the gear train 12, 13.

Reverse speed is established through a reverse gearing shown in Figure 4, which receives its motion from the gear 6. The gear is shiftable to the right from its position shown in Figure 1 into mesh with one of the gears of the reverse train. Shifting of the gear 6 into mesh with the companion gear 7 establishes low speed forward. Shifting of the gear 9 to the right into mesh with the gear 8 gives second speed forward. Shifting of the gear 9 to the left clutches the gear 11 to the countershaft establishing third speed forward through the gears 10, 11. Shifting of the clutch 16 to the right clutches the gear 13 to the countershaft establishing another indirect drive through the gears 12, 13.

All indirect speed ratios are delivered to the output shaft 2 through the gears 14, 15. Direct drive is established by clutching the input shaft 1 and the output shaft 2 directly together through a clutch 20 slidably splined on the output shaft 2 and shiftable in one direction from a central or intermediate position to engage its splines with clutch teeth 21 on the gear 12 which itself is splined to the input shaft 1. The clutch 20 is also shiftable in the opposite direction or to the right from central or intermediate position to clutch the final drive gear 14 to the output shaft 2. When any one of the indirect drives is being used, the gear 14 is clutched to the output shaft 2. On direct drive, the final drive gear 14 on the output shaft 2 is unclutched from the output shaft 2, so that during direct drive the heavy countershaft is not being rotated. The gears of one of the indirect drive trains of gears, as the gears 12, 13, may be of such size or diameter as to constitute and over-drive.

The reverse gearing is shown on a reduced scale in Figure 4 and is effected through the gears 6, 7 and a reverse spool. 23 designates the reverse spool mounted on a suitable stud, shaft or spindle 24 suitably mounted in an end wall of the gear box 4 and having the gear 25 at one end thereof arranged to mesh with the gear 6 when the gear 6 is shifted to the right from its neutral position, shown in Figure 1, or in dotted lines in Figure 4, and having its other gear 26 meshing with the gear 7 on the countershaft. Thus, when the gear 6 is shifted to the right from its position shown in Figure 1, reverse drive is established from the input shaft 1 through gear 6, reverse gear spool 23 and the gear 7, countershaft 3 and final drive gears 15, 14, the latter being then clutched to the output shaft 2 by the clutch 20.

The shiftable elements of the gearing may be selectively shifted by any suitable selecting and shifting mechanism, and as here shown, this is accomplished by axially movable shift rods 27, 28, 29 and a selecting and shifting lever 30 mounted to have a lateral selecting and a fore and aft shifting movement. The shift rods are provided with the usual hubs or blocks 31, 32, 33 mounted on the shift rods 27, 28, 29 respectively, and having forks 34, 35, 36 coacting respectively with the clutches 16 and 20, shiftable gear 9, and gear 6. The blocks 31, 32, 33 are formed with notches, as 38, normally arranged in alinement for receiving the selecting finger 39 on the lower end of the lever 30. The finger 39 is normally arranged in the notch of the rod which effects second and third speeds forward, by shifting the gear 9 to the right or to the left, and is shiftable laterally in either direction into the notch of the block 33 which controls the forks for shifting the gear 6 of the first speed forward and the reverse trains, or the block 31 which effects the shifting of the clutches 20 and 16, as a unit, to effect fourth and fifth speeds forward. The latter, in this embodiment of the invention, is direct drive. The fork 34 coacts with a head 34ᵃ slidable on a rod 34ᵇ rotatably mounted in the gear box, the head having a double fork 34ᶜ, 34ᵈ coacting respectively with clutch 16 and the clutch 20. The fork 35 coacts with a similar head on the rod 34ᵇ and has a single fork 35ᵃ for coacting with the sliding gear 9 on the countershaft. The shift rods are suitably slidably mounted in the cover 40 of the gear box, and the selecting and shifting lever mounted in any well known manner in a tower 41 mounted on the cover. The shifting of the lever laterally to select the first and reverse gear shift rod 29 is against the action of a spring-pressed plunger 42.

The input and output shafts 1, 2 are mounted in suitable bearings 43, 44 in opposite end walls of the gear box, and likewise the countershaft 3 is journalled in suitable bearings 45, 46 in opposite walls of the gear box, and in addition, the output shaft is journalled in an intermediate bearing 47 located adjacent the final indirect drive gear 14, so that the gear 14 is firmly held by the bearings 47 and 44 located close thereto on opposite sides thereof. This bearing, as seen in Figure 3, is supported by an intermediate web or bracket 48 between the side walls of the gear box and spaced from the rear end wall thereof, the bearing including a removable top section 49 secured to the web or partition 48, as by screws 50. The intermediate bearing coacts with the hub 51 of the final drive gear 14, this hub extending through the bearing beyond the same and formed with peripheral clutch teeth with which the clutch 20 coacts.

When the clutch 20 is shifted to the left into engagement with the clutch teeth 21 of the gear 12 to connect the shafts 1, 2 in direct drive relation, the final drive gear 14 is idle or stationary, and hence, when another shift is made from direct drive into an indirect drive, some difficulty may be encountered in re-engaging the clutch teeth of the clutch 20 with the clutch teeth 14ᵃ of the final drive gear 14, as this final drive gear is clutched to the shaft 2 during all indirect drives. To avoid this possible difficulty, means is provided for imparting a slight rotary movement or tendency to rotate to the final drive gear 14, when the clutch 20 is shifted to the left into engagement with the clutch teeth 21 of the gear 12, in order that the clutch teeth 14ᵃ of the final drive gear 14 may have some motion when the shift is being made to clutch the gear 14 to the shaft 2. The means here shown is for brevity's sake called an energizer, and is a friction clutch with sufficient capacity to turn the gear 14 but not transmit torque.

As here shown, this means or energizer comprises disks 52, 53 rotatable respectively with the shaft 2 and the final drive gear 14 and interposed between the side of the gear 14 and the inner face of the adjacent end wall 4 of the gear box, the disk 52 thrusting against the raceway rings of the bearing 44. These disks are provided with internal teeth or lugs 54 and 55 respectively interlocking in ways in the shaft 2 and the hub of the final drive gear 5. The lugs of each disk are usually two in number located diametrically opposite each other. One of the disks, as 53, is pressed with light pressure toward the other, and as here shown, the disk 53 is so pressed by means, in the nature of a spring washer 56, which exerts light pressure on the disk 53 to press it lightly against the disk 52. The washer 55 is in the nature of a wavy flat ring. This energizer also facilitates the engagement of the clutch 16 with the teeth 19 on the countershaft 3 when a gear shift is made, utilizing the clutch 16 to clutch the gear 13 to the countershaft.

By this gear construction, a heavy duty, multiple, change-speed transmission gearing, in this instance, a five-speed forward and reverse, may be mounted in the same available space as heretofore used for gearing with less speed changes, as for instance, four speeds and reverse, and the resulting compact, five-speed transmission gearing has considerably increased capacity with the gear centers the same, as in the transmission gearing of less capacity, and also the gearing has a higher torque rating. For instance, the four-speed transmission gearing gives a normal rating of 185'# and the compact five-speed transmission gearing within the same space with the same gear centers gives a rating of 225' 3 torque.

By this construction, also the heavy countershaft does not rotate when in direct drive, and the drag or inertia effect thereof eliminated. Also, owing to the arrangement of the change-speed trains, one of which may be over-drive, and the final drive train, and the bearing arrangement for the output shaft and the final drive gear thereon, this heavy-duty transmission is compact and sturdy.

What we claim is:

1. In a transmission gearing the combination with input and output shafts arranged in axial alinement a countershaft a plurality of selectively operable change speed gear trains between the input and countershafts and a final gear train between the countershaft and the output shaft common to the former gear trains, including a final drive gear rotatable about the output shaft, and a clutch operable in one direction from central position into two successive positions in both of which said clutch clutches the final drive gear to the output shaft and the other direction from central to clutch the input and output shafts in direct drive relation, and means operable to select and operate said clutch and select and render operative the change speed gear trains including a clutch operable with the former clutch to clutch one of the gears of one of the change speed trains to the countershaft, only when the former clutch is shifted in one direction to the second of its two successive positions.

2. In a transmission gearing, the combination of input and output shafts arranged in axial alinement, a countershaft, trains of change speed gears between the input and countershafts, shifting means for operatively connecting any gear train in motion-transmitting relation to the input and countershafts, a train of final drive gears between the countershaft and the output shaft including a gear normally rotatable about the output shaft and clutchable thereto, said shifting means including a clutch operable in one position to clutch the final drive gear on the output shaft to the output shaft, and in another position to clutch the input and output shafts in direct drive relation, all whereby the countershaft is disconnected from the input and output shafts, when the input and output shafts are clutched directly together, and frictionally engaged means between the output shaft and the final drive gear tending to rotate it without transmitting torque when the final drive gear is unclutched from the output shaft.

3. In a transmission gearing, the combination of input and output shafts arranged in axial alinement, a countershaft, trains of change speed gears between the input and countershafts, shifting means for operatively connecting any gear train in motion-transmitting relation to the input and countershafts, a train of final drive gears between the countershaft and the output shaft including a gear normally rotatable about the output shaft and clutchable thereto, said shifting means including a clutch operable in one position to clutch the final drive gear on the output shaft to the output shaft, and in another position to clutch the input and output shafts in direct drive relation, all whereby the countershaft is disconnected from the input and output shafts, when the input and output shafts are clutched directly together, and means between the output shaft and the final drive gear tending to rotate it without transmitting torque when the final drive gear is unclutched from the output shaft, comprising frictionally engaged members rotatable respectively with the output shaft and the final drive gear.

4. In a transmission gearing, the combination of a suitable gear box, input and output shafts arranged in axial alinement and journalled in the end walls of the gear box, a countershaft, trains of change speed gears between the input and countershafts, shifting means for operatively connecting any gear train in motion-transmitting relation to the input and countershafts, a train of final drive gears between the countershaft and the output shaft including a gear normally rotatable about the output shaft and clutchable thereto, said shifting means including a clutch operable in one position to clutch the final drive gear on the output shaft to the output shaft, and in another position to clutch the input and output shafts in direct drive relation, all whereby the countershaft is disconnected from the input and output shafts, when the input and output shafts are clutched directly together, and friction disks rotatable respectively with the output shaft and the final drive gear and frictionally coacting to turn the final drive gear without transmitting torque, the final drive gear being located adjacent one of the end walls of the gear box, and said friction means being interposed between the final drive gear and the adjacent wall of the gear box.

CARL D. PETERSON.
ELMER J. BARTH.